US005542041A

United States Patent [19]

Corona

[11] Patent Number: 5,542,041

[45] Date of Patent: Jul. 30, 1996

[54] APPARATUS FOR, AND METHODS OF, PROVIDING A UNIVERSAL FORMAT OF PIXELS AND FOR SCALING FIELDS IN THE PIXELS

[75] Inventor: James J. Corona, San Diego, Calif.

[73] Assignee: Brooktree Corporation, San Diego, Calif.

[21] Appl. No.: 319,427

[22] Filed: Oct. 6, 1994

Related U.S. Application Data

[63] Continuation of Ser. No. 987,367, Dec. 7, 1992, abandoned.

[51] Int. Cl.[6] .......... G06F 15/00

[52] U.S. Cl. .......... 395/162

[58] Field of Search .......... 395/162, 164; 345/112, 153, 155, 157, 186, 189, 202

[56] References Cited

U.S. PATENT DOCUMENTS

| | | | |
|---|---|---|---|
| 4,821,208 | 4/1989 | Ryan et al. | 364/518 |
| 4,823,120 | 4/1989 | Thompson et al. | 340/703 |
| 5,170,154 | 12/1992 | Mantopoulos et al. | 340/723 |
| 5,227,863 | 7/1993 | Bilgrey et al. | 358/22 |
| 5,294,918 | 3/1994 | Preston et al. | 345/155 |

*Primary Examiner*—Mark R. Powell
*Assistant Examiner*—U. Chauhan
*Attorney, Agent, or Firm*—Ellsworth R. Roston; Charles H. Schwartz

[57] ABSTRACT

Raster display memories are often arranged to output groups of pixels in progressive blocks, each having a plurality of pixels and each pixel having a plurality of fields. The fields in each pixel may provide color, overlay and cursor information for an individual position on a video screen. The numbers of bits in each pixel and in each field may be variable in different applications. In this system, control information indicates the starting position of each block, the location of each pixel in each block and each field in each pixel and the width of each pixel and each field in number of bits. Using this control information, the system recovers the pixels in each block and the fields in each pixel and processes such information to provide a display of the pixel information on a video screen. The number of bits contained in each field may be expanded to a width (e.g. 8) when the field width is less than eight (8) bits. In this expansion, the expanded field value has an error, compared to the field value before expansion, less than half of the least significant bit in the expanded field. Frequently, the bits in each field before expansion are provided in the positions of greatest binary significance in the expanded field. The unused positions in the expanded field are then filled in the order of progressively decreasing significance by the bits of progressively decreasing significance in the field before expansion, starting from the bit of greatest significance.

25 Claims, 4 Drawing Sheets

| OUTPUT FIELD BIT | SOURCE FIELD WIDTH | | | | | | | |
|---|---|---|---|---|---|---|---|---|
| | 1 | 2 | 3 | 4 | 5 | 6 | 7 | 8 |
| R7 | R7 | R7 | R7 | R7 | R7 | R7 | R7 | R7 |
| R6 | R7 | R6 | R6 | R6 | R6 | R6 | R6 | R6 |
| R5 | R7 | R7 | R5 | R5 | R5 | R5 | R5 | R5 |
| R4 | R7 | R6 | R7 | R4 | R4 | R4 | R4 | R4 |
| R3 | R7 | R7 | R6 | R7 | R3 | R3 | R3 | R3 |
| R2 | R7 | R6 | R5 | R6 | R7 | R2 | R2 | R2 |
| R1 | R7 | R7 | R7 | R5 | R6 | R7 | R1 | R1 |
| R0 | R7 | R6 | R6 | R4 | R5 | R6 | R7 | R0 |

FIG. 8

| SOURCE FIELD | % FULLSCALE DESIRED | BITS APPENDED BY SCALING METHOD | DESTINATION FIELD | % FULLSCALE ACHIEVED | % ERROR |
|---|---|---|---|---|---|
| 000 | 0.00 | 000 00 | 0000 0000 | 0.00 | 0.00 |
| 001 | 14.29 | 001 00 | 0010 0100 | 14.11 | 0.18 |
| 010 | 28.57 | 010 01 | 0100 1001 | 28.63 | -0.06 |
| 011 | 42.86 | 011 01 | 0110 1101 | 42.75 | 0.11 |
| 100 | 57.14 | 100 10 | 1001 0010 | 57.25 | -0.11 |
| 101 | 71.43 | 101 10 | 1011 0110 | 71.37 | 0.06 |
| 110 | 85.71 | 110 11 | 1101 1011 | 85.88 | -0.17 |
| 111 | 100.00 | 111 11 | 1111 1111 | 100.00 | 0.00 |

APPARATUS FOR, AND METHODS OF, PROVIDING A UNIVERSAL FORMAT OF PIXELS AND FOR SCALING FIELDS IN THE PIXELS

This is a continuation of application Ser. No. 07/987,367 filed Dec. 7, 1992.

This invention relates to apparatus for, and methods of, processing bits of information stored in a medium such as a raster display memory to recover information relating to pixels and to fields within the pixels. The invention also relates to apparatus for, and methods of, scaling the pixel fields to provide the fields with a specific number of bits, in other words, a universal width of the output fields in the pixel.

Bits of information are stored in a raster display memory to represent color information for display in the successive pixel positions on a video screen. The bits of information are output in the form of blocks which may have a particular width in any individual system. By "width" is meant the number of bits in each block. For example, the width of the bits in each block may be sixty four (64) bits in an individual system.

There may be a plurality of pixels in each block. For example, when a block has sixty four (64) bits and each pixel has a width of thirty two (32) bits, there are two (2) pixels in each block. Each pixel provides information relating to the display of an image dot at a particular position on a video screen. The number of pixels in a block may vary from system to system or from application to application. There are different possible formats for the pixels in each block. For example, in one (1) system, the pixels may be arranged such that the display is in the order of progressively increasing binary significance within the block. In another system, the pixels may be arranged such that the display is in the order of progressively decreasing binary significance within the block.

In general, each pixel has a plurality of fields. For example, there may be three fields of bits to represent the three (3) primary colors red, green and blue. There may also be a field to represent an overlay in the image on the video screen. The overlay may illustratively provide an overriding pixel value which is useful in displaying rapidly changing portions of a video image without affecting the remaining portion of the visual image. This allows the system to update the rapidly changing portion of the visual image without regenerating the complete visual image. Each pixel may also include a field to provide a cursor. A cursor can be considered as an overlay with a higher priority than the normal overlay. It supersedes the normal overlay.

Each system or application may have unique widths for the blocks, the pixels and the fields. Because of this, the number of bits in the blocks, the pixels and the fields will vary from one system or application to the next. Until now, there has not been a universal system for processing the successive bits of information stored in a display memory for different systems regardless of the number of bits in each block, each pixel and each field. This has required the processor for each display system to be individually designed to meet the specifications of that display system. The processor cannot then be used with any other display system.

There has been another limitation in the processors of the prior art. Even if a universal processor existed for separating the bits stored in a display memory into the successive blocks, the separate pixels in each block and the separate fields in each pixel, it has been difficult to process the fields in each pixel because of the variations in the widths of the fields in different systems. For example, it has been difficult to process fields with a width of six (6) bits and fields with a width of five (5) bits on a universal basis.

It has been recognized for some time that it would be desirable to expand the number of bits in each field to a universal value such as eight (8) bits when the number of bits in each field is less than eight (8). Even though such recognition has existed for some time, no one has been able to provide this expansion on a universal basis. One reason has been that, for different values stored in a field before expansion, the expansion has produced errors which have affected the display on the video screen. For example, when the pixel fields representing the primary colors red, green and blue have been expanded to eight (8) bits for each of these fields, errors in the expansion have caused the colors displayed in the different pixel positions on the video screen to deviate from the true colors in such pixel positions.

In the system of this invention, control information indicates the start of each block, the width of each pixel, and the start of each pixel in each block and each field in each pixel. Using this control information, the system recovers the pixels in each block and the fields in each pixel and processes such information to provide a display of the pixel information on a video screen. The system provides this recovery regardless of such variables in different systems as the widths of the blocks, pixels and fields.

The number of bits in each field may be expanded by the system of this invention to a particular number of output bits (e.g. 8) when the field has less than eight (8) bits. In this expansion, the value in the expanded field has an error, compared to the value in the field before expansion, less than one half (½) of the least significant bit in the expanded output field. Generally the bits in each field before expansion are provided in the positions of greatest binary significance in the expanded field. The unused positions in the expanded field are then filled in the order of progressively decreasing significance by the bits of progressively decreasing significance in the field before expansion, starting from the bit of greatest binary significance.

Figures 6, 7:
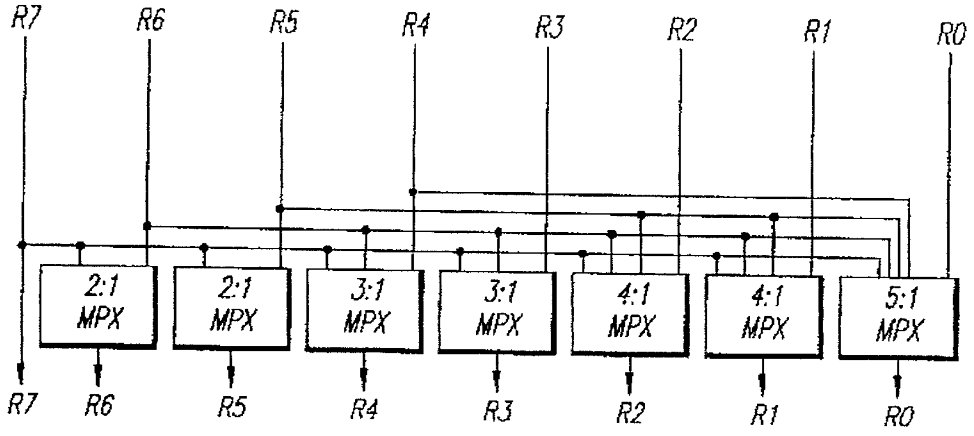
FIG. 6 is a schematic block diagram of a subsystem in this invention for expanding the number of bits in each field to a universal number of bits such as eight (8), regardless of the number of bits in such field, when the number of bits is less than, or equal to, eight (8)

FIG. 7 is a schematic pictorial representation showing how the number of bits in each field are expanded to eight (8) by the sub-system shown in FIG. 7 without significantly affecting the accuracy of the indications in such field; and FIG. 8 is a chart showing examples of different expansions of the binary bits in a field and showing the values of the binary bits in the field before and after the expansion and further showing the relative differences between the values in such field before and after such expansion.

Figure 1:
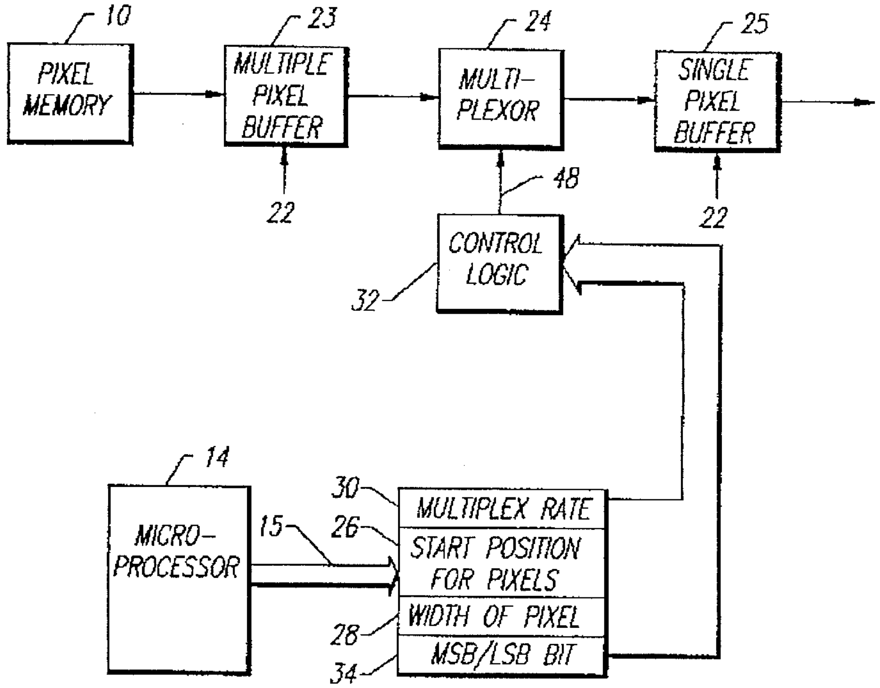
FIG. 1 is a schematic block diagram of a subsystem in this invention for processing information in successive blocks in a display memory to recover the successive pixels in such blocks.

In one embodiment of the invention, a system is provided for separating bits output by a display memory 10 (FIG. 1). The display memory stores a plurality of blocks, each block presented to the system of this invention in a wide parallel bus. Such separation is performed regardless of the number of bits in each block, each pixel and each field. The information in the different fields in each pixel is then used to produce an image at an individual position on a video screen 12 in FIG. 3. The separation of the bits of information in the blocks from the display memory 10 into the successive pixels in each block and the successive fields in each pixel is in accordance with information programmed into a microprocessor 14 in FIGS. 2 and 3. The system included in this invention may be provided on an integrated circuit chip and the microprocessor 14 and the display memory 10 may be external to the chip.

The microprocessor 14 is programmed to indicate the start position of each block of information bits in the display memory 10. This information is introduced by the microprocessor 14 through a MPU port 15 to a plurality of registers which store the information. The microprocessor 14 stores the start position of the block in a register 26 and the width of each pixel in a register 28. The microprocessor 14 also stores information in a register 34 to indicate whether the most significant bit in the block occurs at the beginning or end of the block. This indicates whether the pixels in the block are displayed in an ascending order, or a descending order, of binary significance of the block. The microprocessor 34 further stores in a register 30 the multiplex rate at which pixels are separated from each block. This indicates the number of pixels contained in the block.

The bits in the display memory are separated in parallel form into separate blocks which are stored in an input buffer 23. As will be appreciated, the bits in the buffer 23 may represent a multiple number of pixels. The bits in the input buffer 23 may then be introduced to a multiplexer 24 which sequentially loads each pixel in the block into the single pixel buffer 25. The separation of the pixels in the block is under the control of control logic 32 which indicates the start position of the block and the width of each successive pixel in the block. The control logic 32 is also controlled by the indications in the registers 26, 28 and 34 which are programmed by the microprocessor 14.

Figure 2:
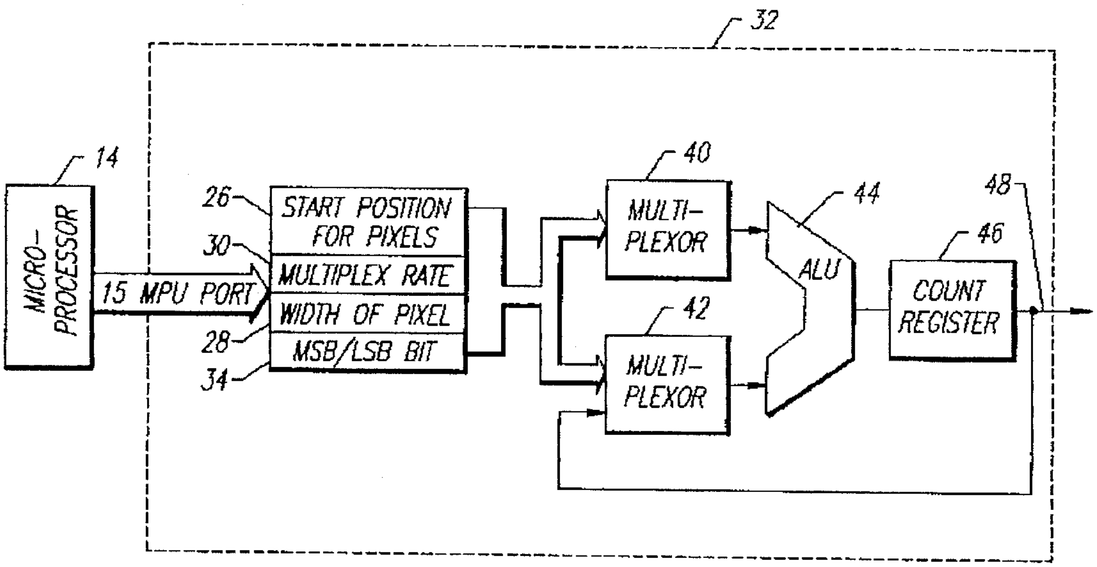
FIG. 2 is a schematic block diagram showing in additional detail certain features of the sub-system shown in FIG. 1.

The control logic 32 is shown in additional detail in FIG. 2 and is indicated by broken lines in that Figure. The register 26 indicating the start position of the first pixel in the input buffer 23, the register 28 indicating the pixel width and the register 30 indicating the multiplex rate for separating each block into pixels are shown in FIGS. 1 and 2. FIG. 2 also indicates the register 34 for indicating the pixel display order in the block.

FIG. 2 includes a multiplexer 40 which receives indications from the register 28 in representation of the width of each pixel as indicated in the register 28. FIG. 2 also includes a multiplexer 42 which receives indications from the register 26 in representation of the start position of each pixel in each block as indicated in the register 26. The outputs of the multiplexers 40 and 42 are introduced to an arithmetic logic unit (ALU) 44. A connection is made from the output of the ALU 44 to the input of a shift count register 46. The output from the shift count register 46 is introduced to an input to the multiplexer 42.

A start indication is introduced from the register 26 through the multiplexer 42 to one input of the ALU 44. This input is used to set the shift count register 46 to the start position of the first pixel in the buffer 23. The second pixel start position is computed when the multiplexer 40 then provides for the passage into the other input of the ALU 44 of the number of bits corresponding to the width of each pixel. The ALU adds or subtracts the two inputs and introduces the result to the shift court register 46. The output from the shift count register 46 is introduced through a line 48 in FIGS. 1 and 2 to the multiplexer 42 to control the operation of the multiplexer in selecting each pixel in the block for input to the single pixel buffer 25.

The third pixel is illustratively selected by first switching the selected input of the multiplexer 42 from the start position register 26 to the shift count register 46 when it contains the start position of the second pixel. This process is repeated until all pixels in the block have been output to the buffer 25. The number of pixels to be output from each block is provided by the multiplex rate register 30.

Figure 4A:
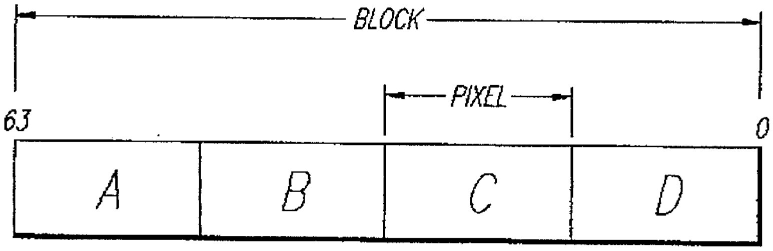
FIGS. 4A–4C are schematic pictorial representations of different formats of pixels in a block to indicate the universality of the system of this invention in processing different pixel formats in a display memory.

FIG. 4 indicates three blocks each having a width of sixty four (64) bits. The bit positions are indicated at one end by a numeral "0" and at the other end by a numeral "63". In FIG. 4*a*, four pixels respectively designated as A, B, C and D are shown. Each pixel accordingly has a width of sixteen (16) bits. The sequence of the pixels is in the order A, B, C and D with the most significant bit in each pixel being at the left. In this sequence, the pixels are multiplexed from the most significant bit of the block through the bits of progressively decreasing significance.

Figure 4B:
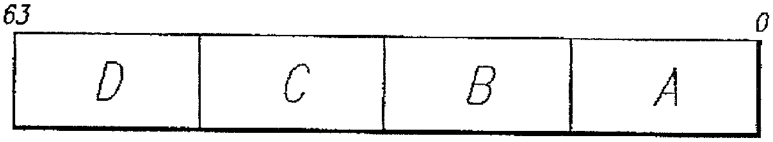
Figure 4C:
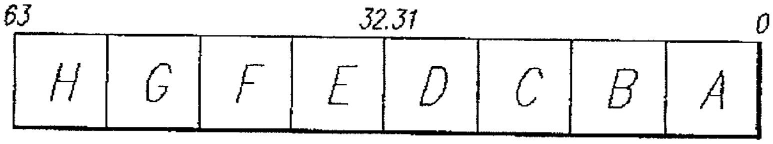

In FIG. 4*b*, the progressive pixels have the sequence A, B, C, and D from the least significant bit at the right toward the most significant bit at the left. In this arrangement, the pixels multiplexed in the order A, B, C and D from the least significant bit of the block at the right toward the most significant bit at the left. FIG. 4*c* shows a block having eight (8) pixels each with eight (8) bits. The pixels have a sequence of A, B, C, D, E, F, G, H from the least significant bit at the right. The pixels are presented from the least significant bit at the right toward the most significant bit at the left. It is not necessary for all of the bits in the block to be used by a pixel. For example, if the multiplex rate register 30 indicates that there are six (6) pixels in each block, only pixels A through F in the previous example in this paragraph would be displayed before moving to the next block.

Figure 5:
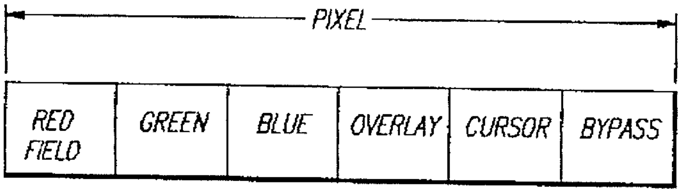
FIG. 5 is a schematic pictorial representation of one (1) format of the different fields in each pixel.

Each pixel contains a plurality of fields as shown in FIG. 5. For example, each pixel may contain three (3) fields respectively representing the primary colors red, green and blue. Each of these fields may have a number of bits to a maximum of eight (8). Each pixel may also contain an overlay field with a number of bits to a maximum of four (4). The overlay field provides for an alternative pixel image from a separate pixel memory to be displayed over the pixel image provided by the red, green and blue fields. Each pixel may further include a cursor field with a number of bits to a maximum of two (2). The cursor may be used to provide a pointer in the visual image. There also may be a field containing a bypass control to a maximum of one (1) bit. The bypass control provides a bypass of the palette random access memory (RAM) and causes the information in the expanded color fields to be output directly to a digital-to-analog converter (DAC) 75.

Figure 3:
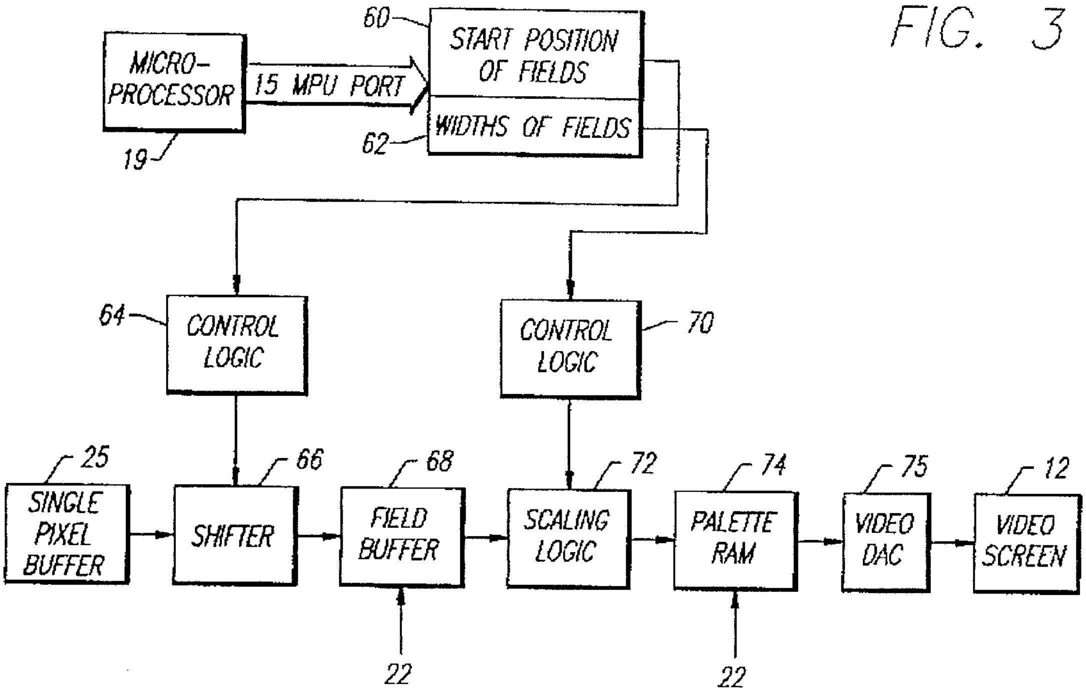
FIG. 3 is a schematic block diagram of a subsystem in this invention for processing the information in each of the successive pixels to recover the fields in such pixel, to expand the number of bits in each field to a universal number such as eight (8) and to process the information in the expanded fields to display the information in such pixel on video screen.

FIG. 3 illustrates a sub-system for separating and scaling from each pixel the different fields shown in FIG. 5. The operation of FIG. 3 for each field is controlled primarily by the start positions of each field as indicated in a register 60. Only one register 60 is shown but it will be appreciated that a number of such registers may be provided each to indicate the start position of an individual one of the fields in each pixel. The start positions in the field widths in the registers 62 are input to the register from the microprocessor 14 through MPU port 15. Only one register 62 is shown but it will be appreciated that a number of such registers may be provided each to indicate the width of an individual one of the fields in each pixel. It will also be appreciated that the sub-system shown in FIG. 3 processes, in a separate sequence, each field such as shown in FIG. 3.

The register 60 inputs the start position of each particular field to control logic 64. The control logic 64 controls the operation of the shifter 66 in passing the appropriate bits of information from the single pixel buffer 25 (also shown in FIG. 1) to the particular field buffer 68. The information passing to the field buffer 68 is preferably in parallel form.

The control logic 64 provides for the operation of the shifter 66 in passing up to eight (8) positions from the start position for each field. The number of positions passed for each field is eight (8) for the red, green and blue fields, four (4) for the overlay field, two (2) for the cursor field and one (1) for the bypass field. These eight (8) positions may include the particular field being separated from the pixel and may include bits in the next field or fields.

The register 62 contains the width of each field. This information is introduced to control logic 70. Thus, although eight (8) bits are stored in the field buffer 68, only the number of bits in the field being processed are passed as a result of the operation of the control logic 70. The control logic 70 controls the expansion of the number of bits in each field to a particular number such as eight (8) when the number of bits in such field is less than eight (8).

The expansion of the number of bits in each field to eight (8) is performed by stages shown schematically as "scaling logic" 72 in FIG. 3. Although the number of bits stored in the field buffer 68 is eight (8) in the preferred embodiment, the scaling logic provides for the expansion only of the bits in the field being processed at any instant. For example, if the number of bits in the field being processed is only six (6) bits, the scaling logic 72 operates only on the first six (6) bits from the buffer 68 and expands these six (6) bits to eight (8) bits.

The expanded number of bits in each field from the scaling logic 72 is introduced to a palette RAM 74 which is known in the art. The palette RAM processes the indications in the different fields and introduces the processed information to the video digital-to-analog converter (DAC) 75 which converts the binary indications to corresponding analog information. The analog information is then introduced to the video screen 12. The information in the different fields in each pixel controls the visual indications presented at an individual position on the video screen 76.

FIG. 7 indicates how the bits in a field are expanded to eight (8) bits from a different numbers of bits less than eight (8) in such field. In FIG. 7, the bits in the field after expansion are designated in the left column by the letter "R" and by numerals between "0" and "7". The left column is designated as "OUTPUT FIELD BIT". In this column, the most significant bit is designated as "R7" and bits of progressively decreasing binary significance are designated by numerals of progressively decreasing value.

FIG. 7 has a top row which is designated as "SOURCE FIELD WIDTH". This indicates the number of bits in the field before expansion of the bits to eight (8). The row below the designation of "SOURCE FIELD WIDTH" has numerical designations between "1" and "8". This indicates the number of bits in the field before expansion. The designations in the column below each of these individual numerical designations between "1" and "8" indicate how the pattern of the binary bits in the expanded field is obtained from an individual number of binary bits in the field before expansion.

In FIG. 7, there are a number of indications in a matrix relationship defined by eight rows to the right of the "OUTPUT FIELD BIT" column and eight columns below the numerals in the row having the numerical designations "1"–"8" to indicate the "SOURCE FIELD Width". This matrix has designations between "R0" and "R7" in the cubicles defined by the matrix. Some of these designations are in cubicles without any cross hatching and others of these designations are in crosshatched cubicles. As will be seen, the clear and cross hatched cubicles alternate in each column.

The unshaded designations at the top of each column in the matrix indicate the bits in the field being processed before the number of bits are expanded to eight (8). For example, in the column designated as "3", there are three (3) bits in the field before expansion as indicated by three unshaded cubicles. These three (3) bits are respectively designated as "R7", "R6" and "R5" and are inserted into the three (3) most significant binary positions in the field after expansion. The three (3) bits are then repeated in the 4th, 5th and 6th cubicles of greatest binary significance in the expanded field. To distinguish these bits from the bits of greatest binary significance, the cubicles holding the bits "R7", "R6" and "R5" in the 4th, 5th and 6th most significant positions in the field after expansion are cross hatched. The "R7" and "R6" bits are then respectively inserted in the two (2) cubicles of least binary significance. These cubicles are not cross hatched to distinguish them from the adjacent cross hatched cubicles in the column.

As will be seen from FIG. 7, there is a pattern for expanding the number of bits in the field to eight (8). The bits in the field before expansion are inserted into the positions of greatest binary significance in the expanded field. The unused positions in the expanded field are then filled with the bits in the field before expansion. The filling of unused positions in the expanded field with the bits in the field before expansion may have to be repeated more than once in order to fill all of the unused positions in the expanded field. For example, when the number of bits in the field before expansion is two (2), these bits have to be repetitively used four (4) times to fill the positions in the field after expansion. Furthermore, when the number of bits in the field before expansion is not evenly divisible into eight (8), all of the bits in the field before expansion are not uniformly recorded in the field after expansion. For example, when the number of bits in the field before expansion is three (3), only the bits R7 and R6, and not the bit R5, are recorded in the least significant positions.

FIG. 6 schematically indicates a subsystem for operating upon the bits in the field before expansion to obtain an expansion of the number of bits to eight (8). The subsystem provides a plurality of input lines respectively designated from left to right as "R7" to "R0". The lines R7-R0 are connected in individual patterns to multiplexers whose outputs are designated as "R6" progressively through "R0". For example, the multiplexer which produces the bit R4 of the expanded field receives the three (3) R7, R6 and R4 of information in the field before expansion and selects one of these bits to become the R4 bit of the expanded field. The bit R4 is selected for widths of four (4) through eight (8); the bit R6 if the width is two (2); and the bit R7 is selected for widths of one (1) bit and three (3) bits.

FIG. 8 is a chart showing the effectiveness of filling the positions in each expanded field in the manner shown in FIGS. 6 and 7 and described above. The first (1st) column of FIG. 8 shows progressive binary values in a field having only three (3) bits before expansion, the least significant bit being shown at the right. These three (3) bits are recorded in the positions of greatest binary significance in the expanded field of eight (8) bits. The second (2nd) column in FIG. 8 shows the percentage that the bits shown in column 1 have to a full count in the field before expansion. This full count is represented by a binary pattern of 111 constituting the maximum capable of being recorded in the field before expansion.

The third (3rd) column in FIG. 8 indicates the pattern of the bits recorded in the five (5) positions of least binary significance in the field after the expansion of the field to eight (8) bits. In the third (3rd) column of FIG. 8, the least significant bit is at the right. The pattern of the bits recorded in the five (5) positions of least binary significance corresponds to the pattern shown in FIG. 7 in the column designated as "3". The fourth (4th) column of FIG. 8 shows the pattern of bits in the eight (8) positions in the expanded field. In the fourth (4th) column of FIG. 8, the least significant bit is at the right.

The fifth (5th) column of FIG. 8 indicates the percentage of the value of the binary bits in the field after expansion, as indicated by the binary bits in the fourth (4th) column of FIG. 8, relative to the full value of such field as indicated by a binary value of "1" for each bit. The sixth (6th) column of FIG. 8 shows the difference in the percentages between the values in the second (2nd) and fifth (5th) columns. A positive value in the sixth (6th) column indicates that the value in the second (2nd) column exceeds the value in the fifth (5th) column. A negative value in the sixth (6th) column indicates that the value in the second (2nd) column is less than the value in the fifth (5th) column.

In order to obtain a complete accuracy in the expansion of each field to eight (8) bits, the differences between the values in the second (2nd) and fifth (5th) columns should not exceed one half (½) of the value of the least significant bit in the expanded field. This is a value of approximately two tenths of one percent (0.2%) of the full scale value. Any relative error less than this percentage of two tenths of one percent (0.2%) in a field will not affect any output indications in a pixel position since it will not affect the value of the least significant bit in the expanded field.

As will be seen, each of the errors shown in the sixth (6th) column of FIG. 8 has a value less than two tenths of one percent (0.2%). If the same process as described above and shown in FIGS. 6–8 is used to determine the error when any binary value less than eight (8) bits is expanded to eight (8) bits, it will be seen that the error resulting from such expansion is less than two tenths of one percent (0.2%)

The apparatus and method described above have certain important advantages. A universal system is provided for processing pixels regardless of (a) the width of the blocks, the pixels in the blocks and the fields in the pixels, (b) the presentation of the bits in the blocks, pixels and fields from the most significant position or the least significant position and (c) the start position of each block, position and field. Furthermore, each field is provided with a particular number of bits such as eight (8). This simplifies and facilitates the processing of the information in each field. The expansion of the bits in each field to eight (8) occurs in a pre-selected relationship in which no error is produced as a result of the expansion.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination, first means for providing a plurality of bits of information in a block having a variable number of pixels and having a plurality of fields in each pixel and a variable number of bits in each field, second means for progressively separating each progressive pixel in such block in accordance with the variations in the number of pixels in such block, third means responsive to the separation of each pixel in such block for sequentially separating such pixel into each of the successive fields in such pixel in accordance with the variations in the number of bits in such field, and the bits in each field having progressive binary values of progressive binary significance, fourth means for expanding the number of bits in each field to a particular number of bits such that the difference between the values of the bits in each field before and after such expansion is less than one half of the value of the least significant bit after such expansion.

2. In a combination as set forth in claim 1, the block having a start position, each pixel in the block having a number of positions, the second means including fifth means for determining the start position of the block, the number of positions in each pixel in the block and whether the start position in the block provides the most significant binary bit in the block or the least significant binary bit in the block.

3. In a combination as set forth in claim 2, the second means including sixth means for counting the successive bits in each block in accordance with the determination of the start of the block and the number of bits in each pixel in the block and for separating the bits in the block into successive pixels in accordance with such count.

4. In a combination as set forth in claim 1, the block having a start position, the third means including fifth means for determining the start position of each of the successive fields in each pixel and for separating the bits in each of the successive fields in accordance with such determination.

5. In a combination as set forth in claim 1, the fourth means including means for indicating the number of bits in each field in each pixel and for processing the bits in such field in a particular relationship to expand the number of bits in such field to the particular number when the number of such bits in such field is less than the particular number such that the difference in the values of the bits in such field before and after such expansion is less than one half of the value of the least significant bit in such field after such expansion.

6. In combination, storage means for providing successive blocks of bits representing information, the blocks including a plurality of pixels in the blocks, each of the pixels including a plurality of fields, each of the fields including a plurality of bits, the number of the bits of information in each pixel and the number of the bits of information in each field in such pixel being variable, the bits in each pixel and in each field of such pixel having values of a progressive binary significance, first means for recovering the bits of information in each of the blocks of information in the storage means and for storing the bits of information in such recovered block, second means for recovering the bits of information in each of the pixels in each block recovered by the first means regardless of the number of bits of information in the pixel and for storing the recovered bits of information in such pixel, third means for recovering each of the fields in each pixel regardless of the number of bits of information in such field and for storing the bits of information in such field, and fourth means for expanding the number of bits in the fields in each pixel to a particular number without varying, by more than one half of the binary significance of the least significant bit in the fields with the expanded number of bits, the difference between the binary significance represented by the expanded number of bits in such fields and the binary significance represented the number of bits in such fields before such expansion.

7. In a combination as set forth in claim 6, the first means including first register means, the second means including second register means, the third means including third register means, and the fourth means including fourth register means.

8. In a combination as set forth in claim 6, the fourth means including means for disposing such bits in the fields in each pixel in the positions of greatest significance in the expanded number of bits in the fields and for repeating the bits, in the expansions of the number of bits in such fields, in the positions of decreasing binary significance.

9. In a combination as set forth in claim 6, each block having a start position and having a direction for the bits with values of progressive binary significance, fifth means for providing control instructions for separating each pixel in each block in accordance with the number of the bits of information in such pixel, the start position of the block in the storage means and the direction of the bits with the values of the progressive binary significance in the block, and the first means being operative to recover the bits of information in each of the pixels in the stored block regardless of the number of the bits of information in such pixel.

10. In combination for use in providing color information on a video screen where the color information is provided in a block by pixels having a variable number of bits, each of the pixels having a plurality of fields each with a variable number of bits, the fields in each pixel representing primary colors and representing particular ones of an overlay, a cursor and a bypass control, the bits in each pixel with values of progressive binary significance in each block having a progressive disposition in the block, the block having a start position, each of the pixels having a start position, each of the fields having a start position, first means for storing bits relating to the progressively disposed pixels to be displayed in the block on the video screen, second means for providing control information representing the number of bits in the pixels, the number of the fields in each pixel, the start positions of each pixel and of each field in such pixel and the progressive disposition of the bits with values of the progressive binary significance in such pixel and such field, third means responsive to the control information for separating the bits in the first means into the plurality of pixels, fourth means responsive to the control information for separating the bits for each of the pixels in the block into each successive one of the fields in such pixel, and fifth means responsive to the control information for processing the bits in each successive one of the fields in each pixel to recover the information represented by the bits in such field.

11. In a combination as set forth in claim 10, first register means for storing the bits of information in the pixels after the separation of the pixels in the block, and second register means for storing the bits of information in the fields after the separation of the fields in each pixel.

12. In a combination as set forth in claim 11, including, means for expanding the number of bits in each field in each pixel to a particular number, without varying the difference between the binary significance of such expanded number of bits and the binary significance of the number of bits before such expansion, by as much as one half (½) of the binary significance of the bit of least binary significance in the expanded number of bits, the means for expanding including means for inserting the bits in each field before expansion into positions of greatest significance in the expanded number of the values of bits in an order of progressively decreasing binary significance and for then repeating the insertion of the values of such bits in the order of progressively decreasing binary significance in positions not yet having bits inserted in the field.

13. In a combination as set forth in claim 10 wherein the second means provides control information representing the start position of the block and the number of bits in the block and the progressive disposition of the bits with the values of the progressive binary significance in each pixel in the block, and wherein sixth means are responsive to the control information representing the start of the block and the number of bits in the block and the progressive disposition of the bits with the values of the progressive binary significance in each pixel in the block for separating the bits for such pixel from the block.

14. In a combination as set forth in claim 10, including, sixth means for expanding the number of bits in each field in each pixel to a particular number, without varying the difference between the binary significance represented by such expanded number of bits and the binary significance of the number of bits before such expansion, by as much as one half (½) of the binary significance of the bit of least binary significance in the field with the expanded number of bits.

15. A method of recovering information from a display memory which stores bits of information relating to a video image in successive blocks each having a variable number of pixels and each of the pixels having a variable number of fields and each of the fields having a variable number of bits, each of the blocks having a start position, each of the pixels having a start position, including the steps of:

providing control logic to control the start positions of the successive blocks in the display memory and the number of pixels in each block, the start position of each pixel in each block and the number of fields in each pixel in each block and the start of each field in each pixel and the number of bits in such field, separating each of the successive blocks in the display memory in accordance with such control logic, separating each of the successive pixels in each block in accordance with such control logic, separating each of the fields in each pixel in accordance with such control logic, and processing the bits of information in each of the fields in each pixel to obtain a visual display on a video screen of the image represented by such bits of information.

16. A method as set forth in claim 15 wherein colors are displayed in progressive pixel positions on a video screen and wherein the colors are formed from primary colors and wherein the fields in each pixel include separate fields each relating to an individual one of the primary colors and wherein the bits in the fields in each pixel providing the primary colors are processed to provide the display on the video screen of color in the progressive pixel positions on the video screen.

17. A computer implemented process as set forth in claim 16 wherein the control logic provides for an expansion of the number of bits in each field to a particular number when the number of bits in such field is less than the particular number and wherein the control logic provides for the disposition of the bits in the positions of greatest binary significance in such expanded field before such expansion and provides for an insertion, in the unfilled positions of progressively decreasing binary significance in such expanded field, of the bits of progressively decreasing binary significance before such expansion.

18. A method as set forth in claim 15 wherein colors are displayed in the pixel positions on a video screen and wherein the fields in each pixel include a separate field relating to an overlay and wherein the bits in the field relating to the overlay are processed to provide for the display of the overlay at individual pixel positions on the video screen.

19. A method as set forth in claim 15 wherein the method is adapted to display a cursor on a video screen and wherein the fields in each pixel include a separate field relating to a cursor and wherein the bits in the field relating to the cursor are processed to provide for the display of the cursor at individual pixel positions on the video screen.

20. A method as set forth in claim 15 wherein the control logic provides for an expansion of the number of bits in each field to a particular number when the number of bits in such field is less than the particular number and wherein the control logic further provides for a difference between the binary significance of the particular number of bits in each field and the binary significance of the bits in such field before such expansion by an amount not greater than one half (½) of the binary significance of the bit of least binary significance in the field with the particular number of bits.

21. In combination, first means for providing a plurality of bits of information in a block having a variable number of pixels and having a plurality of fields in each pixel and a variable number of bits in each field, a single pixel buffer for holding the bits for each successive pixel in the block, a field buffer for holding a particular number of bits corresponding to the maximum number of bits in the largest one of the different fields in the pixels, first control logic for passing the particular number of bits from the first means into the field buffer for each of the fields in each pixel regardless of the number of bits in such field, second means for indicating the number of bits in each field, and second control logic for controlling the number of bits passed from the field buffer for each field in accordance with the number of bits indicated by the second means for such field, and third means for converting into analog form the information represented by the bits passed from the field buffer for each field.

22. In a combination as set forth in claim 21, the third means including scaling logic for converting to the particular number of bits the number of bits passed from the field buffer when the number of such passed bits is less than the particular number and including fourth means for converting into the analog form the information represented by the bits passed by the field buffer for each field.

23. In a combination as recited in claim 22, the scaling logic being operative to process the bits in each field in a particular relationship to expand the number of bits in each field to the particular number when the number of such bits is less than the particular number such that the difference in the values of the bits in such field before and after such expansion is less than one half of the value of the least significant bit in such field after such expansion.

24. In a combination as set forth in claim 21, a multiple pixel buffer for storing the bits in a multiple number of pixels in the block, and a multiplexer, and third control logic for controlling the operation of the multiplexer in passing into the single pixel buffer the bits of information for each successive one of the pixels in the multiple pixel buffer.

25. In a combination as set forth in claim 21, the field buffer being operative to retain the bits for the field next to be processed in the pixel when the number of bits in the field being processed is less than the particular number.

* * * * *